US010648527B2

(12) United States Patent
Slusarczyk et al.

(10) Patent No.: US 10,648,527 B2
(45) Date of Patent: May 12, 2020

(54) TWIN TUBE DAMPER INCLUDING A PRESSURE RATE SENSITIVE SYSTEM

(71) Applicant: BeijingWest Industries Co., Ltd., Beijing (CN)

(72) Inventors: Pawel Slusarczyk, Cracow (PL); Jakub Wrzesinski, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 103 days.

(21) Appl. No.: 15/940,824

(22) Filed: Mar. 29, 2018

(65) Prior Publication Data
US 2018/0306264 A1 Oct. 25, 2018

Related U.S. Application Data

(60) Provisional application No. 62/489,314, filed on Apr. 24, 2017.

(51) Int. Cl.
F16F 9/18 (2006.01)
F16F 9/32 (2006.01)
(Continued)

(52) U.S. Cl.
CPC .......... F16F 9/185 (2013.01); F16F 9/3257 (2013.01); F16F 9/3271 (2013.01); F16F 9/465 (2013.01);
(Continued)

(58) Field of Classification Search
CPC ........ F16F 9/185; F16F 9/3257; F16F 9/3271; F16F 9/465; B60G 13/08; B60G 17/06; B60G 17/08; B60G 2206/41
See application file for complete search history.

(56) References Cited

U.S. PATENT DOCUMENTS 2,107,974 A 5/1935 Bechereau et al.
3,520,384 A * 7/1970 Nicholls ................. F16F 9/185
188/269
(Continued)

FOREIGN PATENT DOCUMENTS

CN 104204601 A 12/2014
CN 104919207 A 9/2015
(Continued)

OTHER PUBLICATIONS

Extended European Search Report dated Oct. 10, 2018 for counterpart European patent application No. EP18168740.1.

Primary Examiner — Melanie Torres Williams
(74) Attorney, Agent, or Firm — William H. Honaker; Dickinson Wright PLLC

(57) ABSTRACT

A twin tube damper assembly includes a main tube defining a fluid chamber. An external tube extends about the main tube defining a compensation chamber therebetween. A piston, slidably disposed in the fluid chamber, divides the fluid chamber into a compression chamber and a rebound chamber. A rod guide is disposed in the rebound chamber, attached to the main tube and the external tube, defining at least one channel in fluid communication with the rebound and compensation chambers. A piston rod extends through the rod guide and is attached to the piston. A pressure rate sensitive system, disposed in the rebound chamber, is attached to the rod guide in fluid communication with the at least one channel, the rebound chamber, and the compensation chamber for regulating the working fluid flow through the rod guide between the rebound and compensation chambers during compression and rebound strokes.

18 Claims, 8 Drawing Sheets

(51) Int. Cl.
  *F16F 9/512* (2006.01)
  *F16F 9/46* (2006.01)
  *B60G 13/08* (2006.01)
  *B60G 17/06* (2006.01)

(52) U.S. Cl.
  CPC ............ *F16F 9/5126* (2013.01); *B60G 13/08* (2013.01); *B60G 17/06* (2013.01); *B60G 2206/41* (2013.01)

(56) References Cited

U.S. PATENT DOCUMENTS

| | | | |
|---|---|---|---|
| 4,189,033 A * | 2/1980 | Katsumori | F16F 9/364 137/853 |
| 5,123,506 A | 6/1992 | Sirven | |
| 5,211,268 A | 5/1993 | Lizell et al. | |
| 5,363,945 A * | 11/1994 | Lizell | F16F 9/364 188/281 |
| 5,598,903 A | 2/1997 | Richardson | |
| 6,793,049 B2 | 9/2004 | Kazmirski | |
| 7,374,028 B2 | 5/2008 | Fox | |
| 8,132,654 B2 | 3/2012 | Widla et al. | |
| 8,544,620 B2 | 10/2013 | Inoue et al. | |
| 8,950,559 B2 | 2/2015 | de Kock | |
| 9,080,631 B2 | 7/2015 | Hoult | |
| 9,150,077 B2 | 10/2015 | Roessle et al. | |
| 9,163,691 B2 | 10/2015 | Roessle et al. | |
| 9,163,693 B2 | 10/2015 | Forster | |
| 2005/0045440 A1 | 3/2005 | Kock et al. | |
| 2007/0056817 A1 | 3/2007 | Ward | |
| 2012/0097493 A1 | 4/2012 | Ewers et al. | |
| 2015/0204411 A1 | 7/2015 | Kus et al. | |

FOREIGN PATENT DOCUMENTS

| | | |
|---|---|---|
| CN | 105723115 A | 6/2016 |
| DE | 3720979 | 1/1989 |
| EP | 409094 B1 | 1/1991 |
| EP | 2163784 | 3/2010 |
| EP | 2935934 B1 | 10/2015 |
| FR | 2856450 B1 | 12/2004 |
| JP | 0626546 | 2/1994 |

* cited by examiner

TWIN TUBE DAMPER INCLUDING A PRESSURE RATE SENSITIVE SYSTEM

CROSS REFERENCE TO RELATED APPLICATION

This application claims the benefit of provisional application Ser. No. 62/489,314 filed on Apr. 24, 2017, the entire disclosure of which are incorporated herein by reference in its entirety

BACKGROUND OF THE INVENTION

1. Field of the Invention

The present invention relates generally to a twin tube damper assembly.

2. Description of the Prior Art

Vehicle suspension systems typically include a spring component or components and a damping component or components. Typically, mechanical springs, such as metal leaf or helical springs, have been used in conjunction with some type of viscous fluid based damping mechanism mounted functionally in parallel. Shock absorbers are used in connection with automobile suspension systems and other vehicle suspension systems to absorb unwanted vibrations which occur during locomotion. To absorb this unwanted vibration, shock absorbers are generally connected between the body and the suspension of the automobile.

One such a shock absorber assembly is disclosed in U.S. Pat. No. 5,211,286. The shock absorber assembly includes a main tube, disposed on a center axis, extending between a first end and a second end. The main tube defines a fluid chamber extending therebetween for containing a working fluid. An external tube disposed on the center axis spaced from the main tube and extending about the main tube between a closed end adjacent to the first end and an opened end adjacent to the second end and defining compensation chamber between the main tube and the external tube. A piston is slidably disposed in the fluid chamber dividing the fluid chamber into a compression chamber and a rebound chamber. The compression chamber extends between the first end and the piston. The rebound chamber extends between the piston and the second end. A rod guide is disposed in the rebound chamber, attached to the second end of the main tube and the opened end of the external tube, and defines at least one channel disposed in fluid communication between the rebound chamber and the compensation chamber to allow the working fluid to flow between the fluid chamber and the compensation chamber. A piston rod extends along the center axis through the rod guide and attached to the piston for moving the piston between a compression stroke and a rebound stroke.

SUMMARY OF THE INVENTION

The invention in its broadest aspect provides a twin tube damper assembly having an improvement of comfort by reducing peaks of forces acting on the vehicle. In addition, the invention provides for a reduction of the forces connected with higher acceleration. The invention further provides for a twin tube damper assembly having separate tuning and proper damper performance at low and high frequencies.

The twin tube damper assembly includes a pressure rate sensitive system disposed in the rebound chamber and attached to the rod guide. The pressure rate sensitive system is disposed in fluid communication with the at least one channel of the rod guide, the rebound chamber, and the compensation chamber for regulating flow of the working fluid through the rod guide between the rebound chamber and the compensation chamber during the compression stroke and the rebound stroke to provide additional damping.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
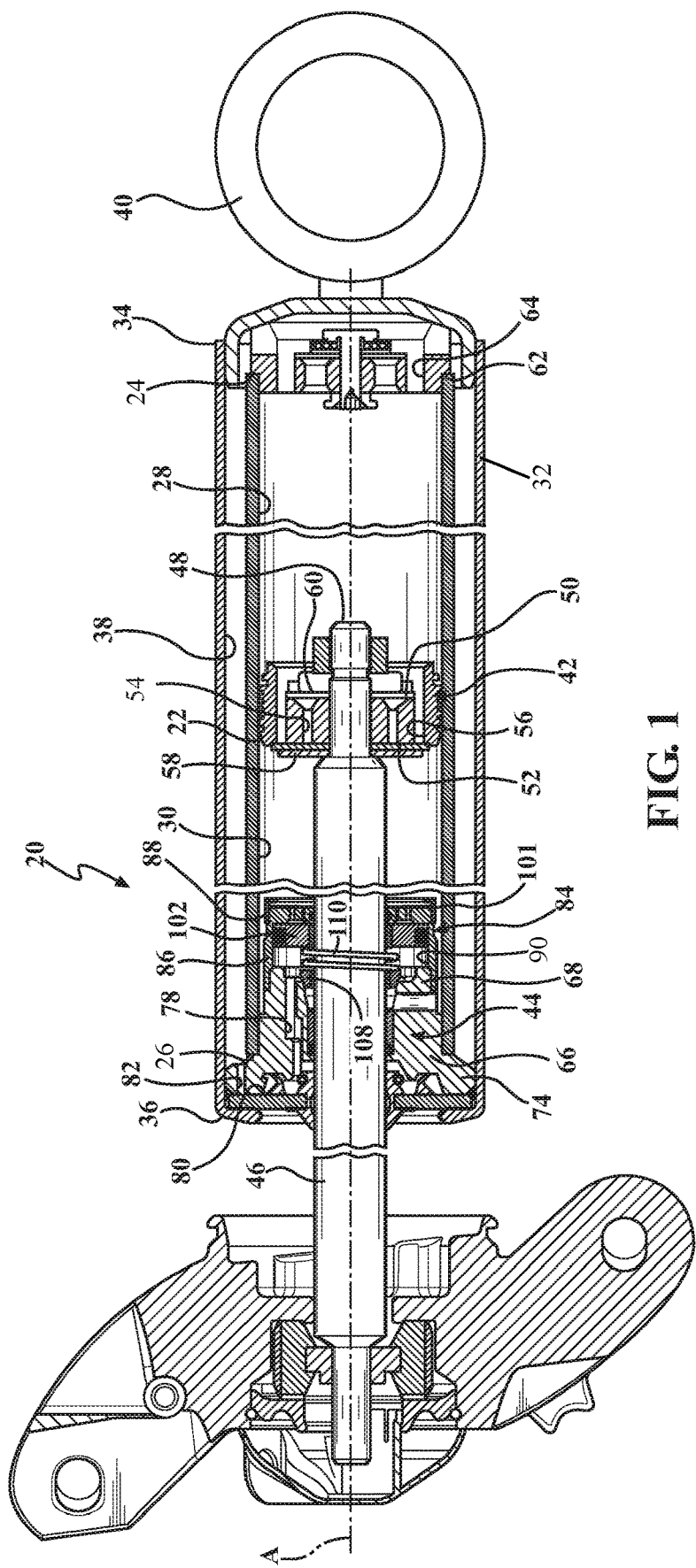
FIG. 1 is a cross-sectional perspective view of the twin tube damper assembly.

Referring to the Figures, wherein like numerals indicate corresponding parts throughout the several views, a twin tube damper assembly 20 in accordance with the present invention is generally shown in FIG. 1.

As generally shown in FIG. 1, the twin tube damper assembly 20 includes a main tube 22, having a generally cylindrical shape, disposed on a center axis A and extends between a first end 24 and a second end 26. The main tube 22 defines a fluid chamber 28, 30 extending between the first end 24 and the second end 26 for containing a working fluid. An external tube 32, having a generally cylindrical shape, is disposed on the center axis A, spaced from the main tube 22, and extends about the main tube 22 between a closed end 34 and an opened end 36. The closed end 34 of the external tube 32 is disposed adjacent to the first end 24 and the opened end 36 of the external tube 32 is disposed adjacent to the second end 26. The external tube 32 defines compensation chamber 38 extending between the main tube 22 and the external tube 32 and annularly about the center axis A. It should be appreciated that the twin tube damper assembly 20 may include a mounting ring 40, having a generally circular shape, disposed at the closed end 34 of the external tube 32 and attached to the closed end 34 of the external tube 32 for securing the external tube 32 to a vehicle.

A piston 42, having a generally cylindrical shape, is slidably disposed in the fluid chamber 28, 30, movable along the center axis A, dividing the fluid chamber 28, 30 into a compression chamber 28 and a rebound chamber 30. The compression chamber 28 extends between the first end 24 and the piston 42. The rebound chamber 30 extends between the piston 42 and the second end 26. A rod guide 44 is disposed in the rebound chamber 30 and attached to the second end 26 of the main tube 22 and the opened end 36 of the external tube 32 to close the rebound chamber 30 and the compensation chamber 38. A piston rod 46 is disposed on the center axis A and extends along the center axis A through the rod guide 44 and into the rebound chamber 30 to a distal end 48. The piston rod 46 is attached to the piston 42 at the distal end 48 for moving the piston 42 along the center axis A between a compression stroke and a rebound stroke. The compression stroke is defined as the piston 42 and the piston rod 46 moving axially away from the rod guide 44. The rebound stroke is defined as the piston 42 and the piston rod 46 moving axially toward the rod guide 44.

The piston 42 has a rebound surface 50 and a compression surface 52. The rebound surface 50 is disposed in the compression chamber 28 facing the first end 24. The compression surface 52 is disposed in the rebound chamber 30 facing the second end 26. The piston 42 defines a plurality of passages 54, 56 including a set of inner passages 54 and a set of outer passages 56. The set of inner passages 54 is disposed radially spaced from the outer passages 56. In other words, the inner passages 54 are disposed closer to the center axis A than the outer passages 56. The passages 54, 56 extend between the compression surface 50 and the rebound surface 52, axially spaced from one another, for allowing the working fluid to flow through the passages 54, 56 during the compression stroke and the rebound stroke. A compression valve 58, having at least one disc with the disc having a generally circular shape, is disposed on the compression surface 52 of the piston 42 covering the outer passages 56 for limiting the flow of the working fluid through the piston 42 during the compression stroke to provide a damping force during the compression stroke. A rebound valve 60, having at least one disc with the disc having a circular shape, is disposed on the rebound surface 50 of the piston 42 covering the inner passages 54 for limiting the flow of the working fluid through the piston 42 during the rebound stroke to provide a damping force during the rebound stroke.

A base valve 62 is attached to the first end 24 of the main tube 22, in fluid communication with the compression chamber 28, for controlling the flowing of the working fluid from the compression chamber 28 to the compensation chamber 38 during the compression stroke and the rebound stroke. The base valve 62 defines a plurality of conduits 64 disposed in fluid connection between the compression chamber 28 and the compensation chamber 38 for allowing the working fluid to flow from the fluid chamber 28, 30 to the compensation chamber 38 during the compression stroke and the rebound stroke.

The rod guide 44 includes a body 66, having a generally cylindrical shape, disposed on the center axis A in the rebound chamber 30. The rod guide 44 is attached to the second end 26 of the main tube 22 to close the rebound chamber 30. The body 66 includes an extension portion 68, having a generally cylindrical shape, disposed in the rebound chamber 30, spaced from the main tube 22, and extends outwardly from the body 66 along the center axis A to a terminal end. The rod guide 44 defines a bore 70, having a generally cylindrical shape, disposed on the center axis A and extends along the center axis A through the body 66 and the extension portion 68 for receiving the piston rod 46. The rod guide 44 further defines a cavity 72, having a generally circular shape, disposed on the center axis A at the terminal end and in fluid communication with the bore 70. The rod guide 44 includes a projection 74 extending radially outwardly from the body 66, annularly about the center axis A, to the opened end 36 of the external tube 32 to close the compensation chamber 38.

The extension portion 68 of the rod guide 44 defines a first channel 76, disposed adjacent to the body 66, spaced from the cavity 72 and in fluid communication with the rebound chamber 30. The first channel 76 extends through the extension portion 68 in a perpendicular relationship with the center axis A for allowing the working fluid to flow from the rebound chamber 30 through the rod guide 44. The extension portion 68 of the rod guide 44 defines a second channel 78, 80, 82, spaced from the first channel 76, in fluid communication with the rebound chamber 30 and the compensation chamber 38, for allowing the working fluid to flow from the rebound chamber 30 through the rod guide 44 and to the compensation chamber 38.

As best shown in FIGS. 2-8, the twin tube damper assembly 20 in accordance with the present disclosure includes a pressure rate sensitive system 84 disposed in the rebound chamber 30, attached to the extension portion 68 of the rod guide 44, and in fluid communication with the at least one channel, the rebound chamber 30, and the compensation chamber 38 for regulating flow of the working fluid through the rod guide 44 during the compression stroke and the rebound stroke to provide additional damping.

The pressure rate sensitive system 84 includes a wall 86, having a generally cylindrical shape, disposed in the rebound chamber 30 and spaced from the main tube 22. The wall 86 is secured to the extension portion 68 of the rod guide 44 and extends annularly outwardly from the extension portion 68, parallel to the center axis A, to a wall end 88 to define a compartment 90, 92 between the rod guide 44 and the wall end 88. The wall 86 includes a flange 94 extending radially inwardly from the wall end 88 to the piston rod 46 to close the compartment 90, 92. The flange 94 defines at least one inlet 96, spaced radially from the center axis A, extends through the flange 94 for allowing the working fluid to flow into the compartment 90, 92. The flange 94 also defines at least one outlet 98, disposed adjacent to the wall end 88 and spaced radially from the inlet 96, for allowing the working fluid to exit the compartment 90, 92. A restrictor valve 100, e.g. a deflected check valve or a one-directional check valve, having a generally circular shape, is disposed in the rebound chamber 30 and attached to the flange 94. The restrictor valve 100 extends about the center axis A to cover the outlet 98 to limit the fluid flow from the rebound chamber 30 to the compartment 90, 92. A retainer 101 is disposed in the rebound chamber 30, adjacent to the flange 94 and the restrictor valve 100, and attached to the pressure rate sensitive system 84 to secure the restrictor valve 100 to the pressure rate sensitive system 84 by sandwiching the restrictor valve 100 between the flange 94 of the pressure rate sensitive system 84 and the retainer 101.

A partitioning member 102, having a generally cylindrical shape, is disposed in the compartment 90, 92 and slidable along the center axis A to divide the compartment 90, 92 into a first portion 90 and a second portion 92. The first portion 90 extends between the rod guide 44 and the partitioning member 102. The second portion 92 extends between the wall end 88 and the partitioning member 102. The partitioning member 102 is movable between a blocked position and an unblock position. When the partitioning member 102 is in the blocked position, the partitioning member 102 is disposed in an abutment relationship with the flange 94 to prevent the working fluid from flowing into the second portion 92 of the compartment 90, 92. When the partitioning member 102 is disposed in the unblocked position, the partitioning member 102 is disposed spaced from the flange 94 allowing the working fluid to flow into the second portion 92. As best shown in FIGS. 3-6, the partitioning member 102 may include at least one orifice 103, extending through the partitioning member 102 to allow the working fluid to flow from the first portion 90 of the compartment 90, 92 to the second portion 92 of the compartment 90, 92. In the event that the partitioning member 102 is moving from the unblocked position to the blocked position, the restrictor valve 100 can be disposed in the second portion 92 and adjacent to the partitioning member 102 to assure the free return of the partitioning member 102.

The partitioning member 102 defines a groove 104 extending about the partitioning member 102. A seal 106, made from an elastomeric material, is disposed in the groove 104 and extends annularly about the partitioning member 102, in an abutment relationship with the wall 86, to isolate the first portion 90 of the compartment 90, 92 with the second portion 92 of the compartment 90, 92. It should be appreciated that, instead of the elastomeric material, the seal 106 can be made from other materials such as but not limited to metal or plastic.

The second channel 78, 80, 82 includes a first section 78, disposed at the terminal end of the body 66, spaced from the first channel 76 and in fluid communication with the cavity 72. The second channel 78, 80, 82 extends from the terminal end to the body 66, parallel to the center axis A, to the extension portion 68 of the rod guide 44. The second channel 78, 80, 82 includes a second section 80, disposed in the extension portion 68 of the rod guide 44, in fluid communication with the first portion 90, and extends outwardly from the first portion 90 and away from the extension portion 68 in a perpendicular relationship with the center axis A. The second channel 78, 80, 82 includes a third section 82, disposed in the projection 74 of the rod guide 44, and extends outwardly from the second section 80, toward the closed end 34, and in fluid communication with the second section 80 and the compensation chamber 38 for allowing the working fluid to flow from the rebound chamber 30 to the compensation chamber 38 through the rod guide 44.

Figure 2:
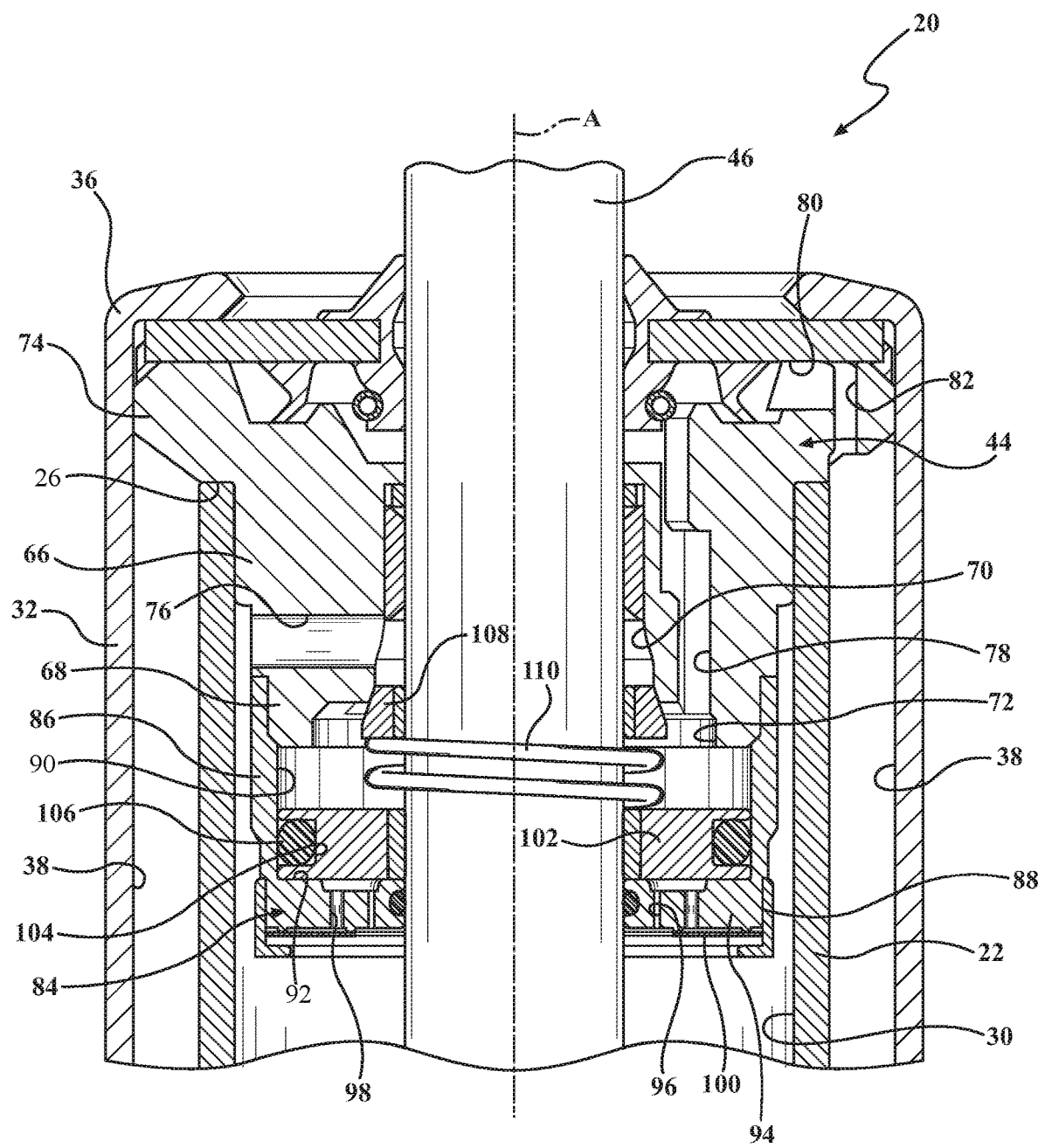
FIG. 2 is an enlarged fragmentary view of the pressure rate sensitive system in the twin tube damper assembly.
Figure 3:
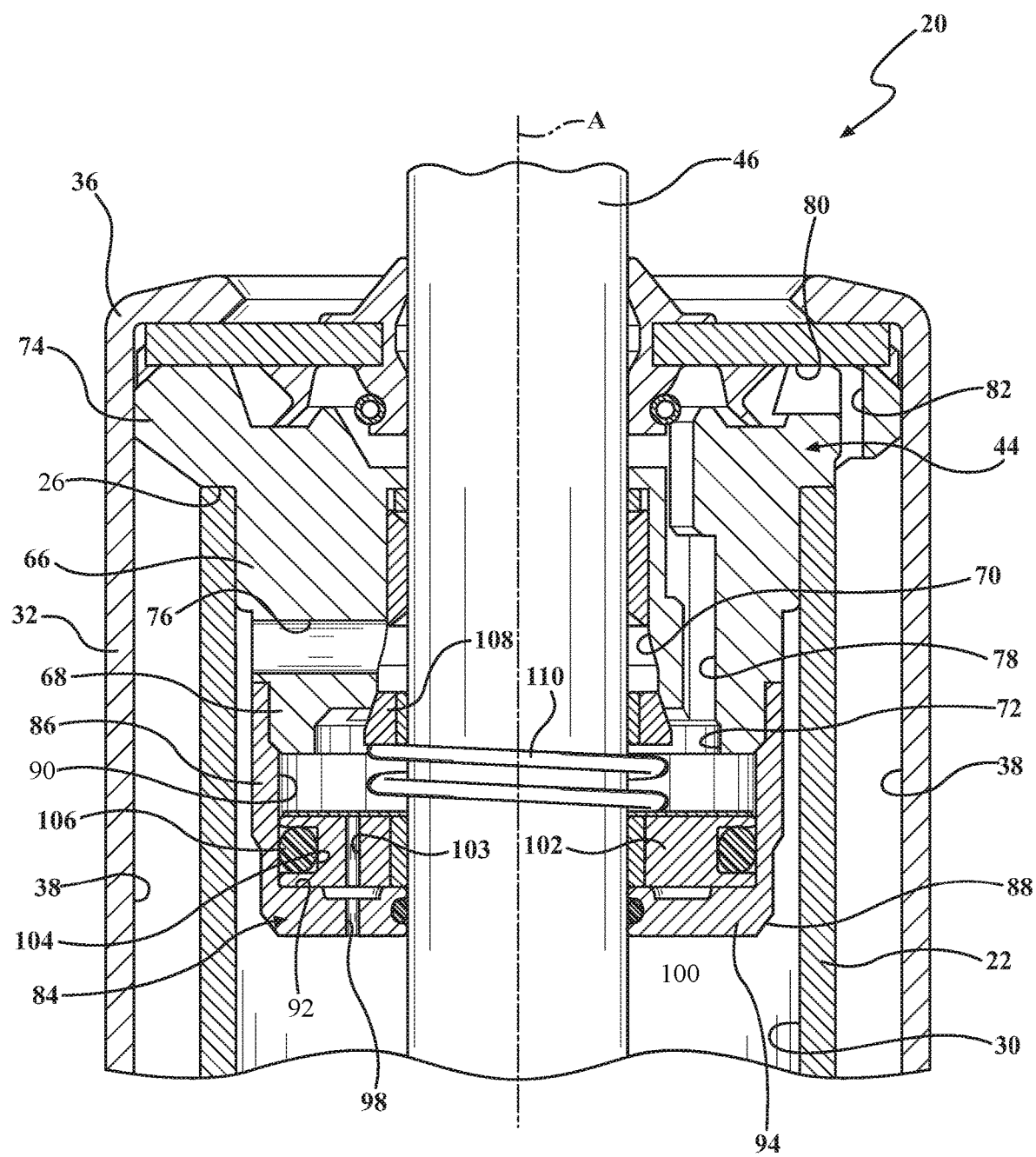
FIG. 3 is an enlarged fragmentary view of the pressure rate sensitive system during a non-active mode.
Figure 4:
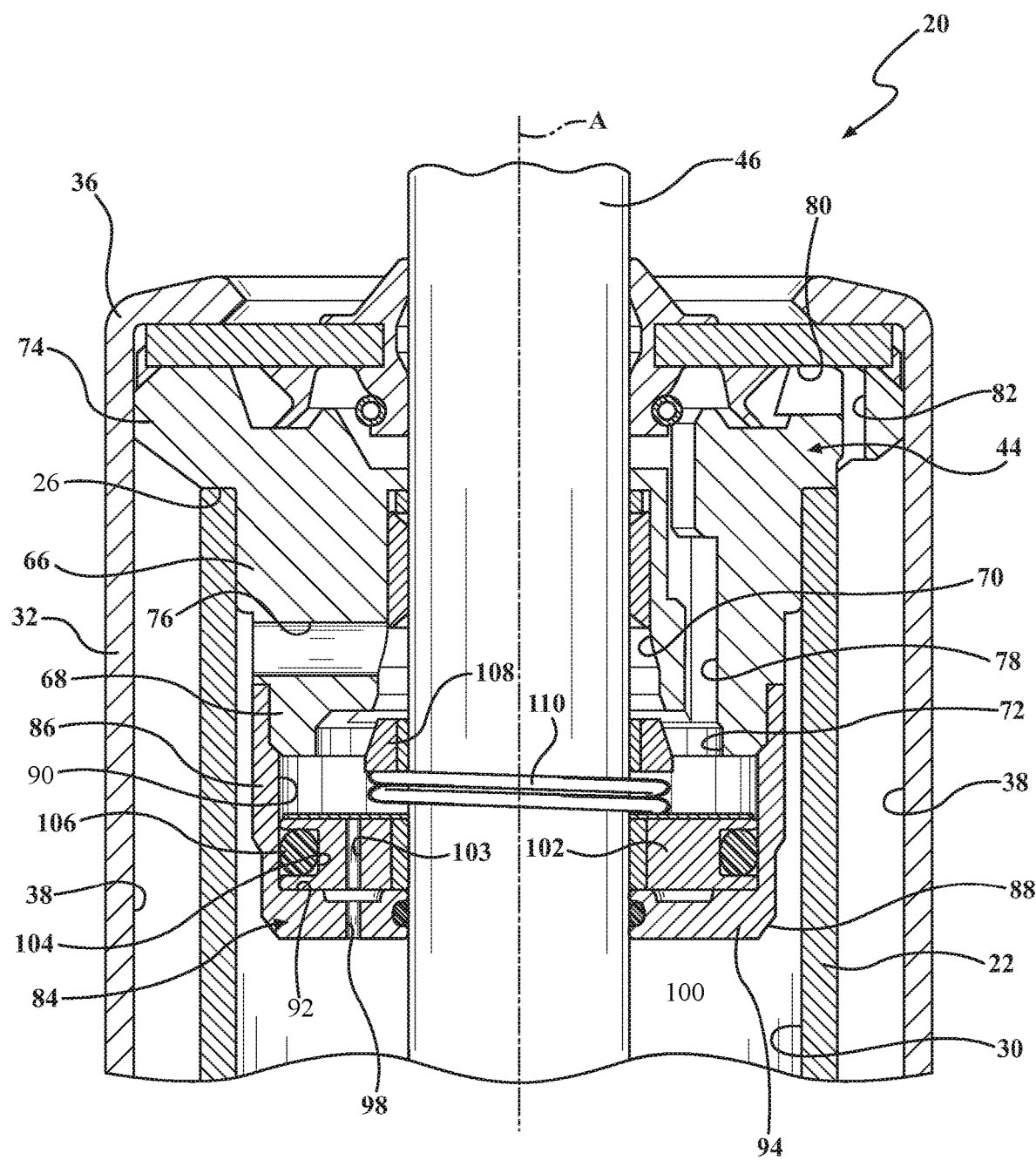
FIG. 4 is an enlarged fragmentary view of the pressure rate sensitive system during an active mode.
Figure 7:
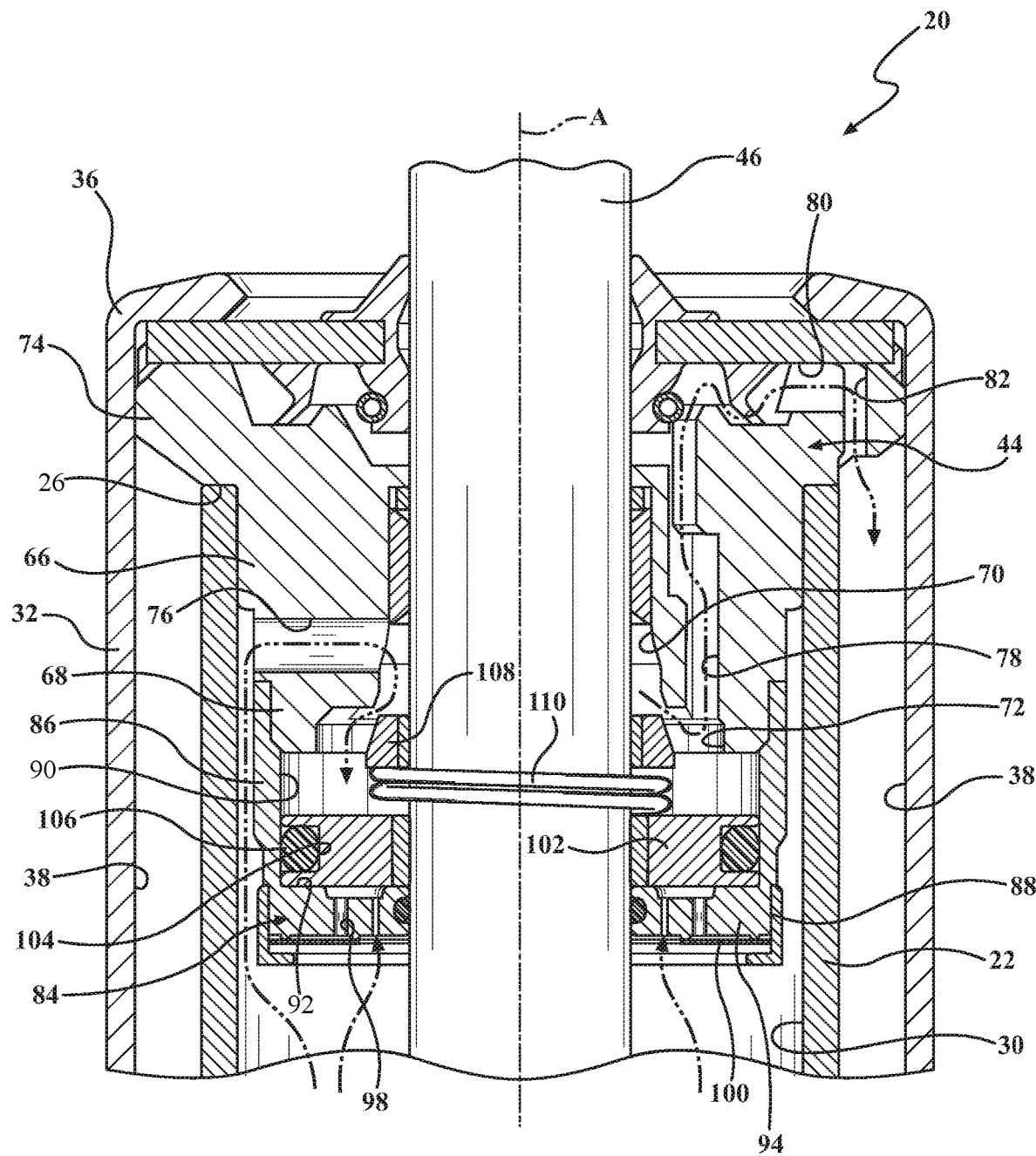
FIG. 7 is an enlarged fragmentary view of the pressure rate sensitive system during the active mode including the flow of the working fluid.

A relief valve 108, having a generally circular shape and a frusto-conical shaped cross-section, is disposed in the first portion 90 of the compartment 90, 92, abutting the at least one channel to regulate the working fluid flow from the fluid chamber 28, 30 to the compensation chamber 38. The relief valve 108 is movable between an active mode and a non-active mode. As best shown in FIGS. 4 and 7, when the relief valve 108 is in the active mode, the relief valve 108 is moved axially along the piston rod 46 and towards the flange 94 to a position wherein the relief valve 108 is spaced from the at least one channel to open fluid communication between the fluid chamber 28, 30, the at least one channel, and the compensation chamber 38. Thus, allowing the working fluid to flow from the rebound chamber 30, through the rod guide 44 via the at least one channel, to the compensation chamber 38. As best shown in FIGS. 2 and 3, when the relief valve 108 is in the non-active mode, the relief valve 108 is moved axially along the piston rod 46 toward the rod guide 44 to a position wherein the relief valve 108 is disposed in an abutment relationship with the at least one channel to close fluid communication between the fluid chamber 28, 30 and the compensation chamber 38.

Figure 5:
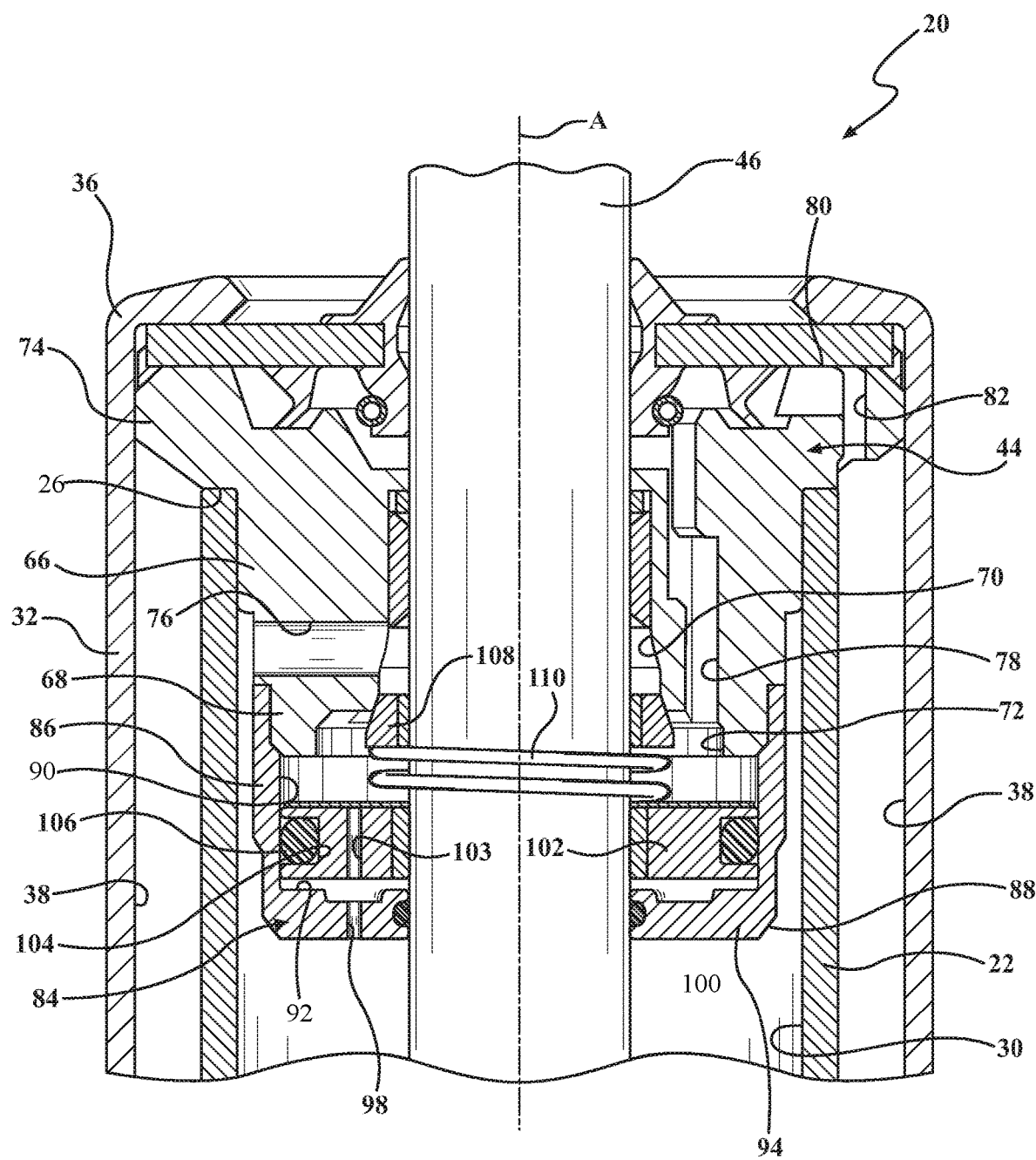
FIG. 5 is an enlarged fragmentary view of the pressure rate sensitive system during a non-active mode and the partition member being in an unblocked position.
Figure 6:
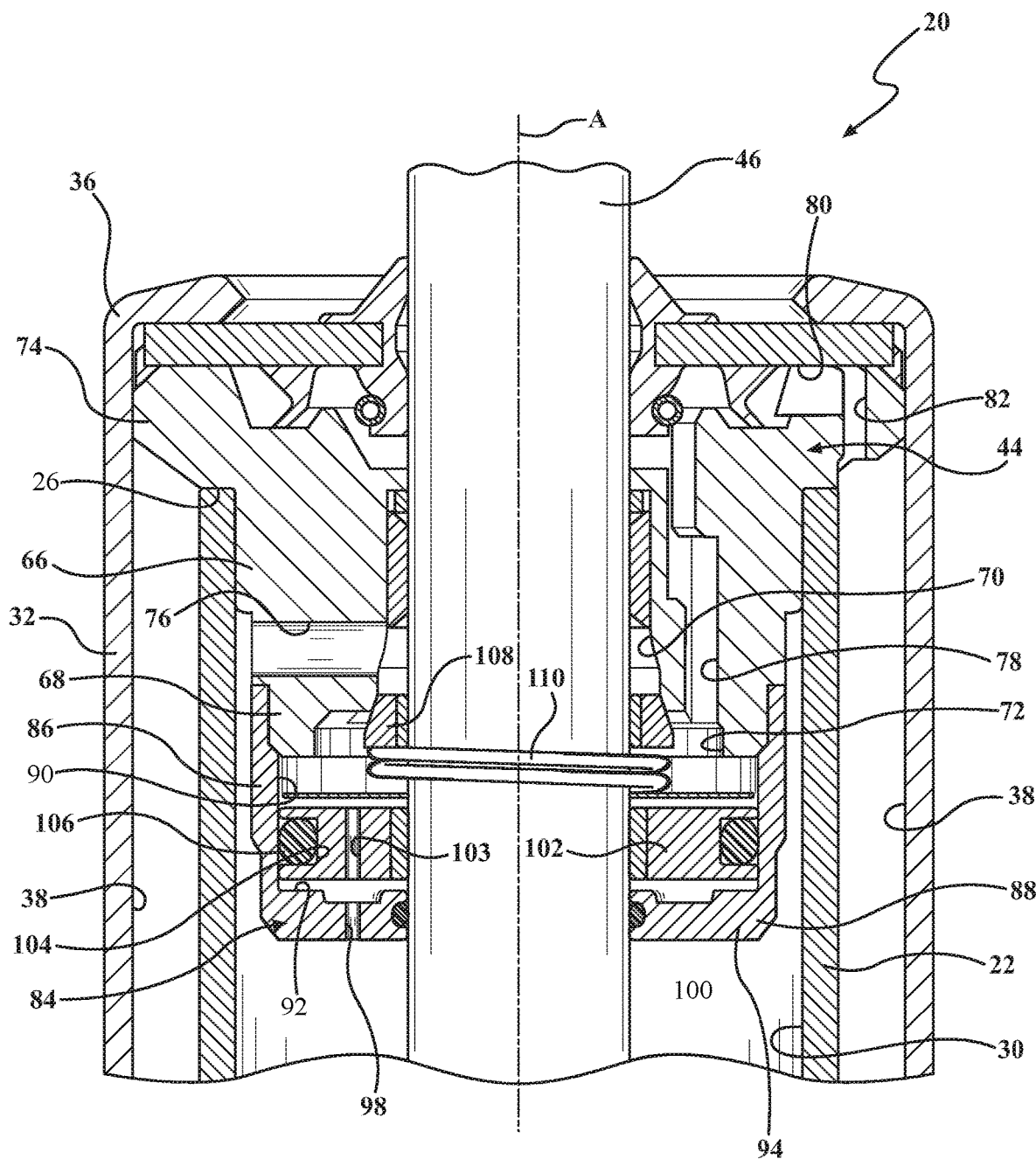
FIG. 6 is an enlarged fragmentary view of the pressure rate sensitive system during a non-active mode and the partition member being in a blocked position.
Figure 8:
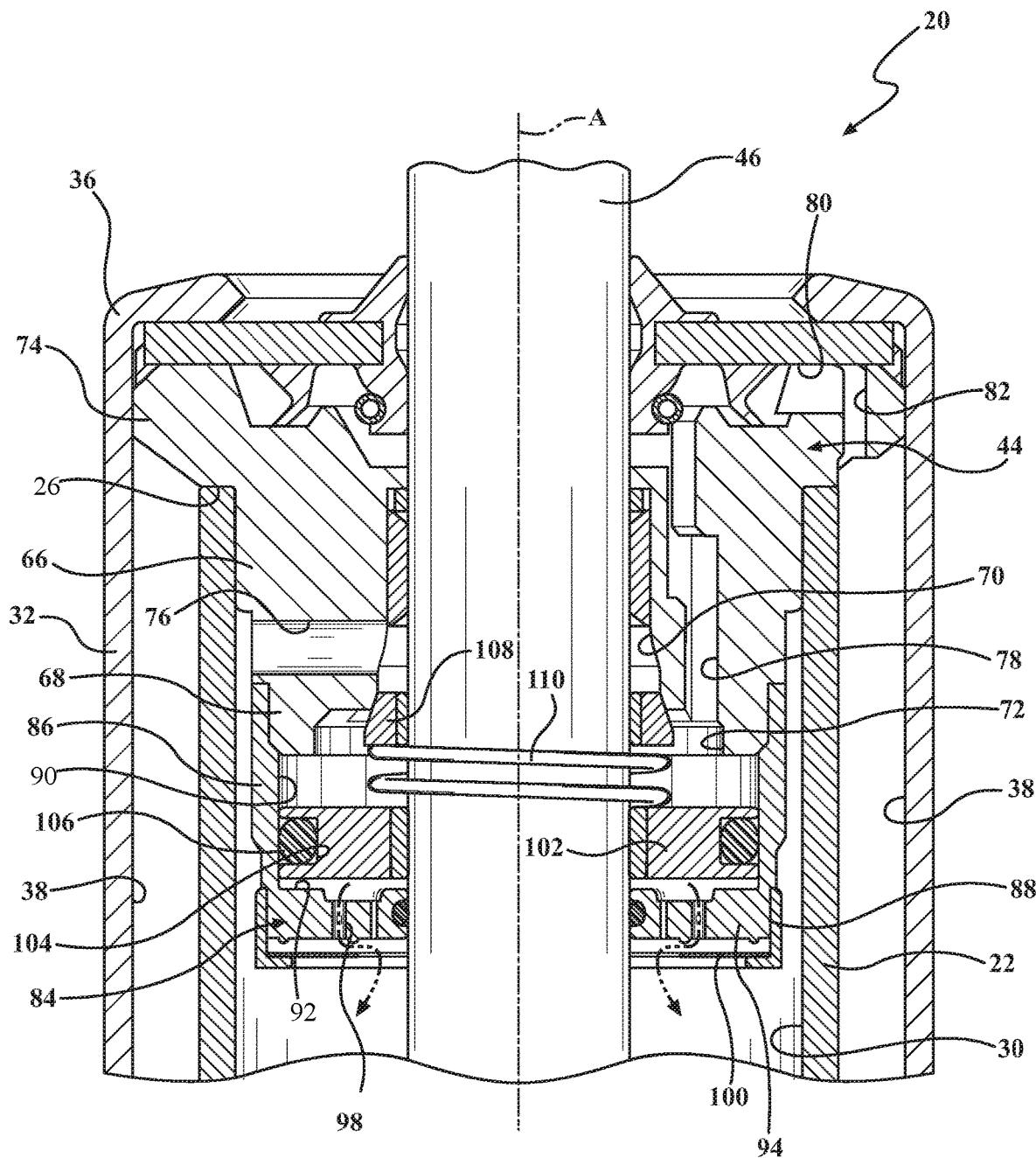
FIG. 8 is an enlarged fragmentary view of the pressure rate sensitive system during the non-active mode and the partition member being in an unblocked position including the flow of the working fluid.

An elastic member 110 is disposed between the relief valve 108 and the partitioning member 102. The elastic member 110 extends between the relief valve 108 and the partitioning member 102 to bias the relief valve 108 against the at least one channel of the rod guide 44 in the non-active mode and move the relief valve 108 from the active mode to the non-active mode. In other words, when the relief valve 108 is in the non-active mode, the elastic member 110 biases the relief valve 108 against the at least one channel to cut off the fluid flow between the rebound chamber 30 and the compensation chamber 38. When the relief valve 108 is in the active mode, the elastic member 110 is compressed toward the wall end 88 of the wall 86 and is able to move the relief valve 108 from the active mode to the non-active mode. In addition, as best shown in FIGS. 5, 6, and 8, the elastic member 110 also biases the partitioning member 102 against the flange 94 in the blocked position and moves the partitioning member 102 from the active mode to the non-active mode. In other words, when the partition member is in the blocked position, the elastic member 110 biases the partitioning member 102 against the flange 94 thereby prevent the working fluid from flowing into the second portion 92 of the compartment 90, 92. When the partitioning member 102 is in the unblocked position, the partitioning member 102 is spaced from the flange 94 compressing the elastic member 110 toward the rod guide 44. The increasing of the force acting on the relief valve 108 causes the relieve valve 108 to stay closed. In addition, the elastic member 110 can return the partitioning member 102 from the unblocked position to the blocked position. Preferably, the elastic member 110 is a spring 110 extending annularly and helically about the piston rod 46 between the relief valve 108 and the partitioning member 102.

The pressure rate sensitive system 84 reduces high frequency impacts transmitted to vehicle body by reducing oil pressure relatively to its speed of increase in rebound chamber 30. The pressure rate sensitive system 84 can operate during the rebound stroke and the compression stroke. High frequency excitations from road are parallel to the high accelerations transmitted to the car body throughout the rapid oil pressure changes inside the damper. For designed working fluid pressure change rate, the pressure rate sensitive system 84 can open an additional oil passage between the rebound chamber 30 and the compensation chamber 38 allowing the working fluid to flow freely or with specified restriction—depending on type of used relief valve 108—to the compensation chamber 38. Accordingly, the pressure inside the main tube 22 will be reduced thereby reducing the force transmitted to the vehicle body 66.

In operation, the non-active mode is generally caused by the twin tube damper assembly 20 being in slow motion thereby producing a slow pressure increase in the twin tube damper assembly 20. During the non-active mode, due to the high pressure difference between the second portion 92 of the compartment 90, 92 and the rebound chamber 30, the working fluid flows from the rebound chamber 30, through the inlet 96 of the flange 94, to the second portion 92 of the compartment 90, 92 of the pressure rate sensitive system 84 pushing the partitioning member 102 toward the rod guide 44. Accordingly, the partitioning member 102 compresses the elastic member 110 toward the rod guide 44 thereby pushing the relief valve 108 against the rod guide 44 and the at least one channel preventing the working fluid from flowing through the first channel 76 and the first portion 90 of the compartment 90, 92 to the compensation chamber 38.

In other words, during the non-active mode, the relief valve 108 abuts against the first channel 76 and the rod guide 44 preventing the working fluid from flowing through the first channel 76. In addition, the partitioning member 102 moves to the unblocked position, e.g. toward the rod guide 44, allowing the working fluid to flow through the inlet 96 of the flange 94 into the second portion 92 of the compartment 90, 92. Afterward, the elastic member 110 will push the partitioning member 102 back toward the flange 94. The outlet 98 of the flange 94 allows the working fluid to flow from the second portion 92 to the rebound chamber 30 to assure the free return of the partitioning member 102 to the blocked position. As the working fluid exits the second portion 92 through the outlet 98, the flow of the working fluid may be limited by the restrictor valve 100 and the outlet 98. In other words, the force from the compressed elastic member 110 is greater than the force from the fluid pressure acting on the upper surface of the relieve valve 108 thereby preventing the working fluid flow between the rebound chamber 30 and the compensation chamber 38.

The active mode is generally caused by the twin tube damper assembly 20 being in movement with high acceleration. During the active mode, the high restriction of the fluid flow by the relief valve 108 on the first channel 76 causes a large increase in the working fluid pressure in the first channel 76 relative to the working fluid pressure in the second compartment 90, 92 under the partitioning member 102. In addition, due to the inlet 96 having a high restriction, the fluid pressure cannot increase under the partitioning member 102 as fast as in the bore 70 and the first channel 76. In response to the large increase in the working fluid pressure, the relief valve 108 moves toward the flange 94 thereby opens fluid communication between the first channel 76, the first portion 90 of the compartment 90, 92, and the compensation chamber 38 allowing the working fluid to flow from the rebound chamber 30 to the compensation chamber 38. At the same time, reducing the working fluid pressure in rebound chamber 30.

It should be appreciated that the fully extended opening point for forces acting on the relief valve 108 from pressure and the elastic member 110 can be tuned by restriction of the first channel 76, the compression rate and the preload of the elastic member 110, diameter of the partitioning member 102, diameter of the relief valve 108, and the diameter (or the restriction) of the inlet 96. Modifications of these parameters may have an influence on the sensitivity of the pressure rate sensitive system 84.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A twin tube damper assembly comprising:
   a main tube disposed on a center axis and extending between a first end and a second end and defining a fluid chamber extending therebetween for containing a working fluid;
   an external tube disposed on said center axis spaced from said main tube and extending about said main tube between a closed end adjacent to said first end and an opened end adjacent to said second end and defining compensation chamber between said main tube and said external tube;
   a piston slidably disposed in said fluid chamber dividing said fluid chamber into a compression chamber between said first end and said piston and a rebound chamber between said piston and said second end;
   a rod guide disposed in said rebound chamber and attached to said second end of said main tube and said opened end of said external tube and defining at least one channel disposed in fluid communication between said rebound chamber and said compensation chamber to allow the working fluid to flow between said fluid chamber and said compensation chamber;
   a piston rod extending along said center axis through said rod guide and attached to said piston for moving said piston between a compression stroke and a rebound stroke;
   a pressure rate sensitive system disposed in said rebound chamber and attached to said rod guide and in fluid communication with said at least one channel of said rod guide and said rebound chamber and said compensation chamber for regulating flow of the working fluid through said rod guide between said rebound chamber and said compensation chamber during said compression stroke and said rebound stroke to provide additional damping;
   wherein said pressure rate sensitive system includes a wall disposed in said rebound chamber spaced from said main tube and secured to said rod guide and extending to a wall end to define a compartment between said rod guide and said wall end;
   wherein said pressure rate sensitive system includes a relief valve disposed in said compartment abutting said at least one channel to regulate the working fluid flow from said fluid chamber to said compensation chamber whereby said relief valve is movable between an active mode with said relief valve being spaced from said at least one channel to open fluid communication between said fluid chamber and said at least one channel and said compensation chamber and a non-active mode with said relief valve being in an abutment relationship with said at least one channel to close fluid communication between said fluid chamber and said compensation chamber; and
   a partitioning member slidably disposed in said compartment about said piston rod and spaced from said relief valve dividing said compartment into a first portion between said rod guide and said partitioning member and a second portion between said partitioning member and said wall end.

2. The twin tube damper assembly as set forth in claim 1 wherein said relief valve has a circular shape and a frusto-conical shaped cross-section.

3. The twin tube damper assembly as set forth in claim 1 wherein said wall includes a flange extending radially inwardly from said wall end to said piston rod.

4. The twin tube damper assembly as set forth in claim 3 wherein said flange defines at least one inlet spaced radially from said piston rod for allowing the working fluid to flow into said second portion of said compartment and at least one outlet spaced radially from said inlet for allowing the working fluid to exit said second portion of said compartment.

5. The twin tube damper assembly as set forth in claim 4 further including an elastic member disposed in said second portion of said compartment extending between said relief valve and said partitioning member to bias said relief valve against said at least one channel of said rod guide in said non-active mode and said partitioning member against said flange in a blocked position to prevent the working fluid from flowing into said second portion of said compartment.

6. The twin tube damper assembly as set forth in claim 5 wherein said elastic member is a spring extending annularly and helically about said piston rod between said relief valve and said partitioning member.

7. The twin tube damper assembly as set forth in claim 4 further including a restrictor valve disposed in said rebound chamber and attached to said flange and covering said outlet to limit the fluid flow from said second portion of said compartment to said rebound chamber to provide additional damping force.

8. The twin tube damper assembly as set forth in claim 7 further including a retainer disposed in said rebound chamber adjacent to said flange and said restrictor valve and attached to said pressure rate sensitive system to secure said restrictor valve to the pressure rate sensitive system.

9. The twin tube damper assembly as set forth in claim 3 wherein said partitioning member defines a groove extending about said partitioning member; and
   a seal disposed in said partitioning groove and extending annularly about said partitioning member and in an abutment relationship with said wall to isolate said first portion of said compartment with said second portion of said compartment.

10. The twin tube damper assembly as set forth in claim 3 wherein said partitioning member defines at least one orifice extending through said partitioning member to allow the working fluid to flow from said first portion of said compartment and said second portion of said compartment, and
   a restrictor valve disposed in said first portion adjacent to said partitioning member to cover said at least one orifice.

11. The twin tube damper assembly as set forth in claim 5 wherein said rod guide includes a body disposed on said center axis in said rebound chamber and attached to said second end of said main tube to close said rebound chamber.

12. The twin tube damper assembly as set forth in claim 11 wherein said body including an extension portion disposed in said rebound chamber spaced from said main tube and extending outwardly from said body along said center axis to a terminal end.

13. The twin tube damper assembly as set forth in claim 12 wherein said rod guide further includes a projection extending radially outwardly from said body and annularly about said center axis to said opened end of said external tube to close said compensation chamber.

14. The twin tube damper assembly as set forth in claim 13 wherein said rod guide defines a bore disposed on said center axis and extending along said center axis through said body and said extension portion for receiving said piston rod; and
   a cavity disposed on said center axis at said terminal end and in fluid communication with said bore and said first portion of said compartment.

15. The twin tube damper assembly as set forth in claim 14 wherein said at least one channel includes a first channel disposed adjacent to said body spaced from said cavity and in fluid communication with said rebound chamber and said first portion of said compartment and extending through said extension portion perpendicular to said center axis for allowing the working fluid to flow from said rebound chamber into said first portion of said compartment.

16. The twin tube damper assembly as set forth in claim 15 wherein said extension portion of said rod guide defines a second channel spaced from said first channel and in fluid communication with said first portion of said compartment and said compensation chamber for allowing the working fluid to flow from said rebound chamber through said rod guide to said compensation chamber.

17. The twin tube damper assembly as set forth in claim 16 wherein said second channel includes a first section disposed at said terminal end of said body spaced from said first channel and in fluid communication with said cavity and extending from said terminal end to said body parallel to said center axis to said extension portion of said rod guide;
   a second section disposed in said extension portion of said rod guide and in fluid communication with said first portion and extending outwardly from said first portion in a perpendicular relationship with said center axis; and
   a third section disposed in said extension portion of said rod guide and extending outwardly from said second section toward said closed end and in fluid communication with said second section and said compensation chamber for allowing the working fluid to flow from said rebound chamber to said compensation chamber through said rod guide.

18. A twin tube damper assembly comprising:
   a main tube disposed on a center axis and extending between a first end and a second end and defining a fluid chamber extending therebetween for containing a working fluid;
   an external tube disposed on said center axis spaced from said main tube and extending about said main tube between a closed end adjacent to said first end and an opened end adjacent to said second end and defining compensation chamber between said main tube and said external tube;
   a piston slidably disposed in said fluid chamber dividing said fluid chamber into a compression chamber between said first end and said piston and a rebound chamber between said piston and said second end;
   a rod guide disposed in said rebound chamber and attached to said second end of said main tube and said opened end of said external tube and defining at least one channel disposed in fluid communication between said rebound chamber and said compensation chamber to allow the working fluid to flow between said fluid chamber and said compensation chamber;
   a piston rod extending along said center axis through said rod guide and attached to said piston for moving said piston between a compression stroke and a rebound stroke;
   a pressure rate sensitive system disposed in said rebound chamber and attached to said rod guide and in fluid communication with said at least one channel of said rod guide and said rebound chamber and said compensation chamber for regulating flow of the working fluid through said rod guide between said rebound chamber and said compensation chamber during said compression stroke and said rebound stroke to provide additional damping;
   wherein said pressure rate sensitive system includes a wall disposed in said rebound chamber spaced from said main tube and secured to said rod guide and extending to a wall end to define a compartment between said rod guide and said wall end;

wherein said pressure rate sensitive system includes a relief valve disposed in said compartment abutting said at least one channel to regulate the working fluid flow from said fluid chamber to said compensation chamber whereby said relief valve is movable between an active mode with said relief valve being spaced from said at least one channel to open fluid communication between said fluid chamber and said at least one channel and said compensation chamber and a non-active mode with said relief valve being in an abutment relationship with said at least one channel to close fluid communication between said fluid chamber and said compensation chamber; and wherein said relief valve has a circular shape and a frusto-conical shaped cross-section.

\* \* \* \* \*